(12) United States Patent
Liu

(10) Patent No.: US 6,318,675 B1
(45) Date of Patent: Nov. 20, 2001

(54) SOLAR WING THERMAL SHOCK COMPENSATION USING SOLAR WING POSITION ACTUATOR

(75) Inventor: Ketao Liu, Cerritos, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/416,157

(22) Filed: Oct. 11, 1999

(51) Int. Cl.⁷ ....................................................... B64G 1/24
(52) U.S. Cl. ............................................................. 244/164
(58) Field of Search ................................... 244/164, 168, 244/171, 173

(56) References Cited

U.S. PATENT DOCUMENTS

| | | | |
|---|---|---|---|
| 5,211,360 | 5/1993 | Zimbelman | 244/164 |
| 5,310,144 | 5/1994 | Salvatore et al. | 244/168 |
| 5,337,981 | * 8/1994 | Bender | 244/164 |
| 5,517,418 | 5/1996 | Green, et al. | 364/434 |
| 5,563,794 | 10/1996 | Cosner et al. | 364/434 |
| 5,620,529 | 4/1997 | Bassily et al. | 136/245 |
| 5,697,582 | * 12/1997 | Surauer | 244/168 |
| 5,720,452 | 2/1998 | Mutschler, Jr. | 244/173 |
| 5,996,942 | * 12/1999 | Price et al. | 244/168 |
| 6,003,817 | * 12/1999 | Basuthakur et al. | 24/158 R |

FOREIGN PATENT DOCUMENTS 11-152097 * 6/1999 (JP) .

OTHER PUBLICATIONS

Johnston and Thornton, An Evaluation of Thermally-Induced Structural Disturbances of Spacecraft Solar Arrays, 1996 IEEE, pp. 1–6, 0–7803–3547–3–7–16–96080.

* cited by examiner

Primary Examiner—Charles T. Jordan
Assistant Examiner—George L. Steele
(74) Attorney, Agent, or Firm—Gates & Cooper LLP (57) ABSTRACT

A method, apparatus, article of manufacture for compensating for solar wing thermal shock in a spacecraft. The method comprises the steps of determining solar wing compensation to compensate for the thermal shock disturbance and rotating the solar wing about a second axis according to the determined compensation, wherein the second axis is substantially perpendicular to the first axis and to a vector from the spacecraft to the sun. The solar wing compensation can be based on predicted solar wing deflections due to thermal shock perturbations, or if available, solar wing temperature measurements. In an embodiment of the present invention applicable to satellites with multiple solar wings, asymmetric control is applied by independent adjustment of the thermal shock compensation loop controlling each solar wing. In yet another embodiment of the present invention, the solar wing position actuator is further commanded by a feedback control loop using the measured spacecraft attitude. The apparatus comprises an attitude control system having a device for predicting or measuring solar wing perturbations, at least one solar wing position actuator, cooperatively coupled to the solar wing for rotating the solar wing about a second axis, wherein the second axis is substantially perpendicular to the first axis and to a vector from the spacecraft to the sun, and a thermal shock compensation loop, for generating at least one solar wing position actuator command to rotate the solar wing about the second axis in accordance with the predicted or measured solar wing perturbations.

29 Claims, 10 Drawing Sheets

SOLAR WING THERMAL SHOCK COMPENSATION USING SOLAR WING POSITION ACTUATOR

BACKGROUND OF THE INVENTION

1. Field of the invention

The present invention relates to systems and methods of controlling three axis stabilized spacecraft, and in particular to a method and system for performing solar wing thermal shock compensation using a solar wing position actuator.

2. Description of the Related Art

Thermal shock disturbance is a common problem experienced by earth orbit spacecraft. When such spacecraft enter and exit earth shadow, abrupt temperature changes cause rapid deformation of spacecraft solar wing panels, which results in significant induced spacecraft attitude disturbances.

There are a number of methods that have been employed to solve this problem, many of which are outlined in "An Evaluation of Thermally-Induced Structural Disturbances of Spacecraft Solar Arrays" by J. D. Johnston and E. A. Thornton, August 1996, which is hereby incorporated by reference herein. These conventional solutions to the thermal shock disturbance problem generally fall into two categories.

The first category of conventional solutions relates to the mechanical design of the solar wing panels. Here, critical structures are designed to minimize temperature gradients and the thermal deformation and resulting induced attitude disturbances. Such designs are disclosed in U.S. Pat. No. 5,720,453, entitled "Solar Panel Parallel Mounting Configuration," issued Feb. 24, 1998 to Mutschler et al, U.S. Pat. No. 5,620,529, entitled "Low Disturbance Solar Array," issued Apr. 15, 1997 to Bassily et al., which references are hereby incorporated by reference herein. One significant problem with this category of solutions is that they can significantly increase the cost of the spacecraft.

The second solution relies instead on the spacecraft attitude control system to compensate for the induced solar disturbances. These systems use control actuators to actively counteract disturbance torques resulting from thermal deformation of solar wing panels. Typically, this is accomplished by using traditional control actuators such as reaction wheels to compensate thermal shock disturbance.

However, controlling the spacecraft eclipse thermal transient becomes a significant challenge because of the high magnitude of solar wing thermal shock disturbance. Traditional control actuators such as reaction wheels are limited by their control torque capabilities, and are ineffective in the presence of such high magnitude disturbance. Thrusters can provide high control torque, but it costs propellant, requires complicated procedure to transit from wheel control to thruster control and back to wheel control, and changes spacecraft momentum state. Developing a dedicated actuator of high torque capability only for thermal shock is undoubtedly very costly.

An example of such a control system is disclosed in U.S. Pat. No. 5,211,360, entitled "Spacecraft Thermal Disturbance Control System, issued May 18, 1993 to Darrell F. Zimbleman, which is hereby incorporated by reference herein. This thermal disturbance control system comprises a network of distributed temperature sensors located on solar wing surfaces and a reaction wheel assembly mounted on a solar wing yoke. This is a relatively costly scheme because a dedicated control system including control electronics and microprocessors (in addition to the distributed sensor network and reaction wheel assembly) is needed to implement this scheme.

Another example of spacecraft attitude control system for compensating for thermal shock disturbance is disclosed in U.S. Pat. No. 5,517,418, entitled "Spacecraft Disturbance Compensation Using Feedforward Control," issued May 14, 1996 to Green et al., which is hereby incorporated by reference herein. During the thermal transient, this scheme feeds a predicted thermal control torque profile to the attitude control actuator to counteract thermal disturbance.

A third thermal disturbance compensation scheme is disclosed in U.S. Pat. No. 5,563,794, entitled "Repetitive Control of Thermal Shock Disturbance," issued Oct. 8, 1996 to Cosner et al., which is incorporated by reference herein. This reference discloses a learning procedure that allows the spacecraft attitude control system to learn control errors due to thermal disturbance over several eclipse thermal shock cycles. Using the information thus obtained, the control system maintains precise pointing in the presence of thermal shock disturbances.

One limitation of the foregoing techniques for minimizing thermal shock disturbances is that they are typically expensive and/or ineffectual to compensate for large disturbances.

SUMMARY OF THE INVENTION

As can be seen from the foregoing, there is a need for an inexpensive yet effective system and method for compensating for solar wing thermal shock. The present invention satisfies that need with a method and apparatus using solar wing position actuators to compensate for solar wing thermal shock. The invention provides a spacecraft thermal disturbance control system that effectively compensates solar wing thermal shock disturbance of very high magnitude.

The present invention comprises a control system and method for controlling a spacecraft in the presence of predictable and unpredictable solar wing thermal shock disturbances. The present invention uses solar wing position actuators as well as traditional control actuators such as reaction wheels to compensate for solar wing disturbances. A solar wing position actuator is a gimbaled actuator that controls solar wing elevation angles with respect to spacecraft bus.

Solar wing position actuators normally have order of magnitude higher torque capability than traditional attitude control actuators such as reaction wheels. They also locate in a unique interface position between solar wing and spacecraft bus that is at middle of thermal shock disturbance path from solar wing to spacecraft bus. These make them much more effective in compensating solar wing thermal shock disturbance of very high magnitude than traditional attitude control actuators. In addition, solar wing position actuators already exist in many spacecraft product lines, since they are often used to deploy solar wings and to adjust solar wing positions to follow the Sun in elevation. They can therefore be incorporated in to spacecraft thermal shock control systems without much additional cost or complexity.

In one embodiment, the present invention comprises both feedforward open loop control and feedback closed loop control. The open loop portion of the control system compensates for predictable thermal shock disturbances using the position actuators, while the closed loop portion controls unpredictable disturbances using the position actuators as well as traditional attitude control actuators.

When measurements of solar wing temperatures are available, the control method uses these measurements to adjust solar wing thermal shock control so that it can effectively compensate unpredictable thermal shock disturbance as well. When measurements of the solar wing temperatures are not available, the thermal shock control uses a predicted solar wing position profile to compensate the disturbance. This profile is developed based on analytical prediction before the launch of spacecraft and will be calibrated in initial operation phase of the spacecraft on orbit. If temperature sensors are available on the solar wing, their temperature measurement is used to adjust the solar wing position through a nonlinear function that maps the temperature measurements to position steps of the position actuator.

The closed loop portion of the control system uses the solar wing position actuator in concert with traditional attitude control actuators. The portion of control torques that exceeds the capacity of these traditional attitude control actuators is converted to solar wing position command and sent to the solar wing position actuators. The position actuators then provide high level compensation torques for the disturbances of very high magnitudes.

More specifically, the technique described by the present invention begins by determining the solar wing compensation to compensate for the thermal shock disturbances. This is accomplished by either predicting solar wing position during eclipse using a predetermined solar wing position profile, or by measuring the temperature of the solar wing extending from the satellite along a first axis. Then, the solar wing is rotated about a second axis according to the predicted position or measured temperature of the solar wing, wherein the second axis is substantially perpendicular to the first axis and to a vector from the spacecraft to the sun. In one embodiment of the present invention, the predicted position or measured solar wing temperature is used in a thermal shock compensation loop to command a solar wing position actuator to move the solar wing. In another embodiment applicable to satellites with multiple solar wings, asymmetric control is applied by independent adjustment of the compensation loop controlling each solar wing. In yet another embodiment of the present invention, the solar wing position actuator is further commanded by an attitude control loop using the measured spacecraft attitude.

The attitude control system comprises either predetermined solar wing position predictions or at least one temperature sensor for measuring the temperature of the solar wing, and at least one solar wing position actuator, cooperatively coupled to the solar wing, for rotating the solar wing about a second axis, wherein the second axis is substantially perpendicular to the first axis and to a vector from the spacecraft to the sun, and a thermal shock compensation loop, for generating at least one solar wing position actuator command to rotate the solar wing about the second axis in accordance with either the predicted solar wing position or, when solar wing temperature measurements are available, the measured solar wing temperature about the second axis.

Hence, the present invention uses solar wing position actuators for thermal shock disturbance compensation. Because of high torque capability of the solar wing position actuators, this invention provides very effective compensation for thermal shock disturbances of high magnitude. The present invention also provides a low cost solution for spacecraft that already has such position actuators and uses them for wing deployment and wing elevation angle adjustments.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
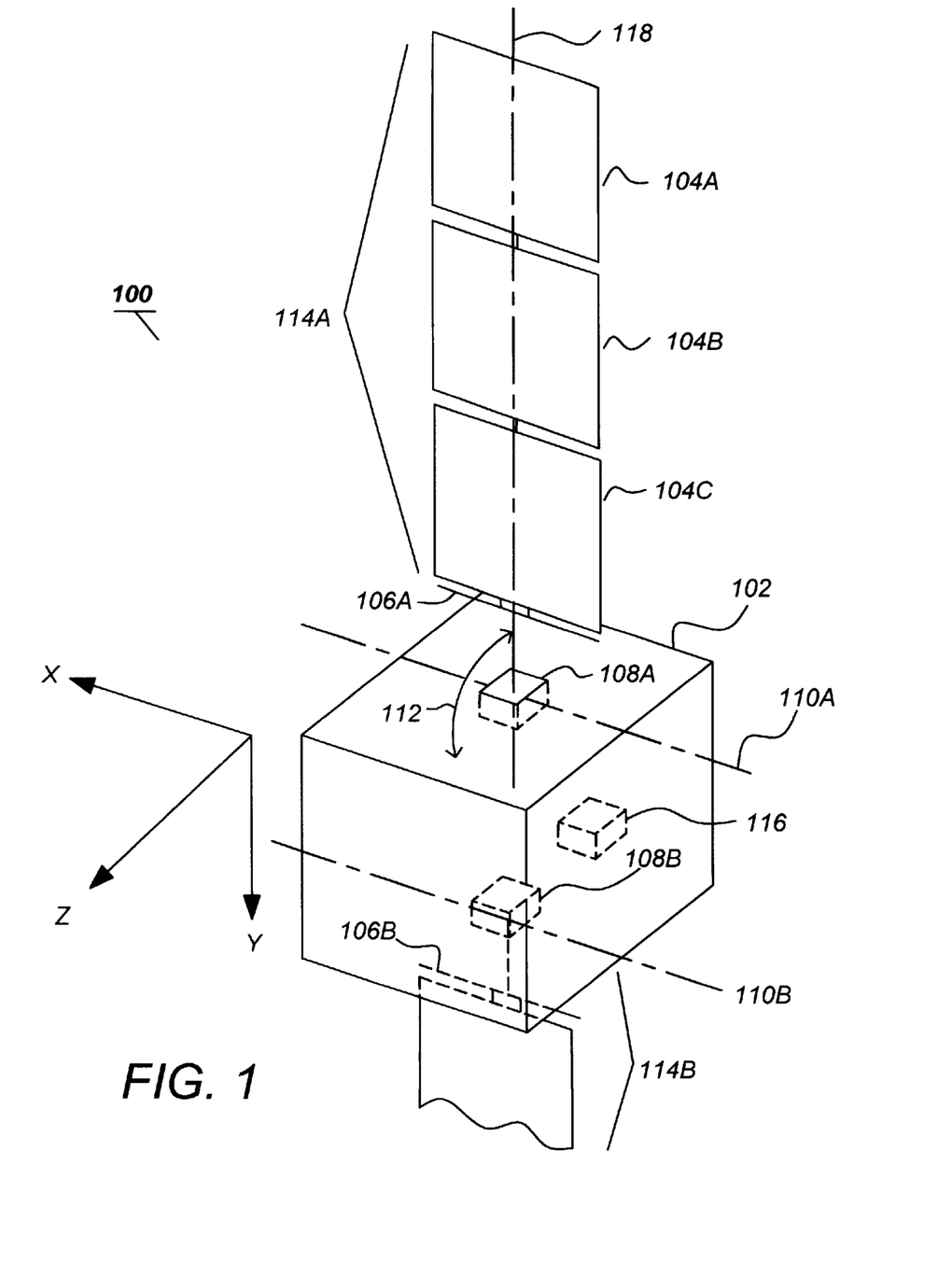
FIG. 1 is a schematic representation of a satellite and an associated solar wing.

FIG. 1 is a schematic diagram of a spacecraft 100 (hereinafter alternatively referred to as a satellite). The spacecraft 100 comprises a spacecraft bus 102 or body, a North solar wing 114A that is used to collect solar radiation to generate electricity for the spacecraft 100. The North solar wing 114A comprises a North solar wing yoke 106A coupled to a plurality of solar wing panels 104A, 104B, and 104C (hereinafter referred to collectively as solar wing panels 104). The North solar wing yoke 106A can be rotated about north solar wing rotational axis 110A, by a North solar wing position actuator 108A. The North solar wing position actuator 108A is typically a gimbaled actuator mounted at the tip of the North solar wing yoke 106A. The North solar wing position actuator 108A normally comprises a step motor and a gear chain that can rotate the solar wing elevation angle 112 with respect to the spacecraft bus 102. During North solar wing 114A deployment, the North solar wing position actuator 108A is often used to step the North solar wing 114A out of its stowed position. In normal on-orbit operation, the North solar wing position actuator 108A can be used to rotate the solar wing 114A about the North solar wing rotational axis 110A to track the Sun in different seasons or to balance the solar torque on the spacecraft 100. In one embodiment, the spacecraft 100 also comprises a south solar wing 114B with a south solar wing yoke 106B and a south solar wing position actuator 108B. The South solar wing and associated components function like those of the North solar wing 114A described above. Hereinafter components common to the North solar wing 114A and the South solar wing 114B will be referred to collectively without the letter designation (e.g. solar wing 114, solar wing position actuator 108, etc.)

Figure 2A:
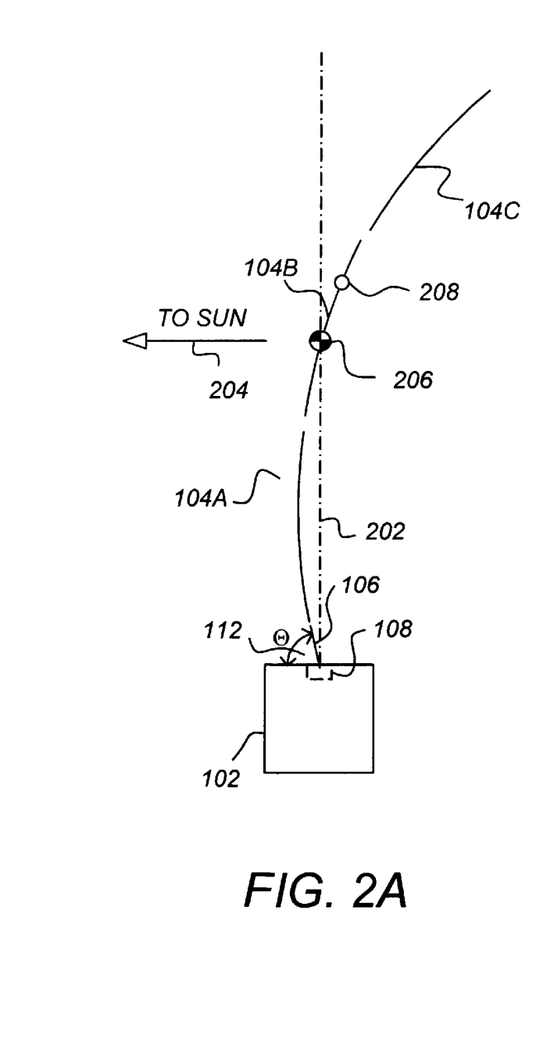
FIGS. 2A–C are diagrams presenting an overview of thermal shock disturbance compensation using a solar wing position actuator.
Figure 2B:
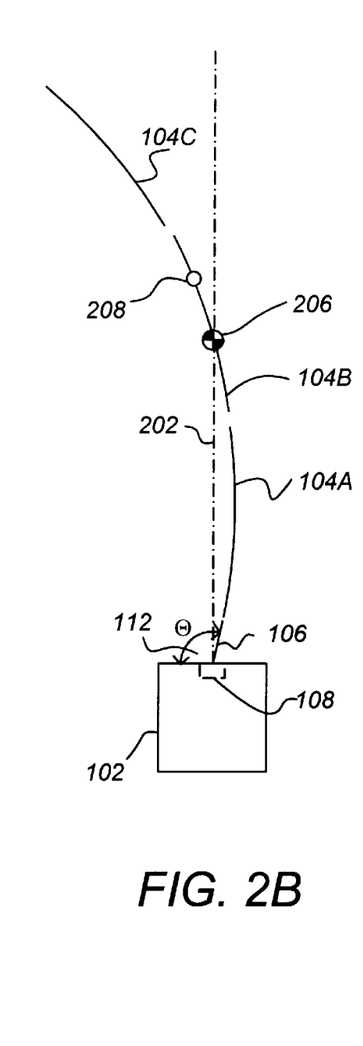
Figure 2C:
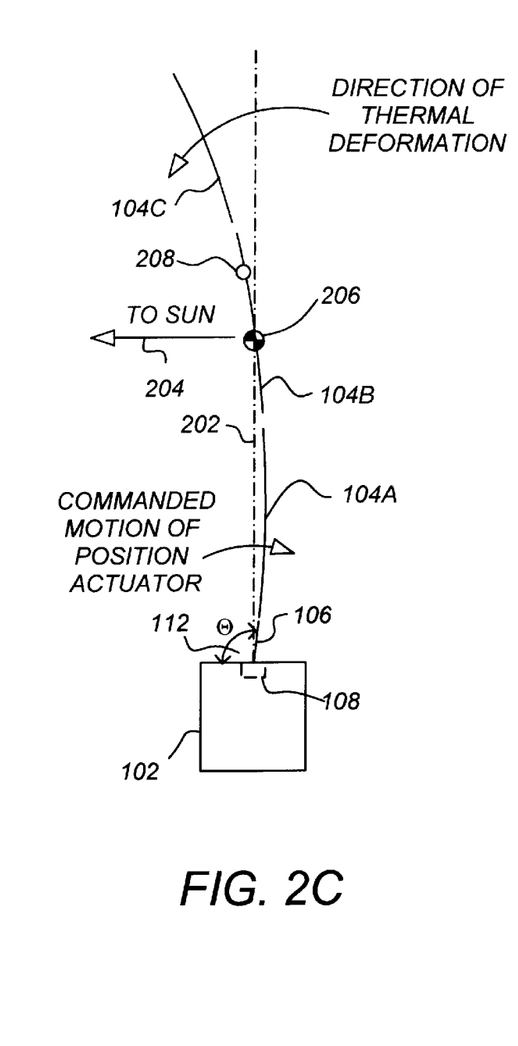

FIG. 2 is a diagram depicting the use of the solar wing position actuator 108 to compensate for thermal shock induced perturbations. FIG. 2A shows the deformation of the solar wing panels 104 when the spacecraft is illuminated by the Sun (which is located in a direction from the spacecraft 100 as indicated by vector 204). A thermal gradient (between the Sun-facing surface of the solar panels 104 and the surfaces facing away from the Sun) expands the Sun-facing surfaces more than the surfaces facing away from the Sun. As a result, the solar panels 104 bend away from the Sun, as shown. To keep the solar wing's center of mass 206 aligned with the plane of the undeformed solar wing 202, the solar wing position actuator is stepped towards the Sun, resulting in solar wing elevation angle θ 112 between the spacecraft bus 102 and the yoke 106.

FIG. 2B is a diagram illustrating the spacecraft in eclipse. Here, the satellite 100 is no longer illuminated by the Sun. Hence, the solar wing panels 104 cool down and bend in a direction opposite from that when the spacecraft 100 is illuminated by the Sun. To maintain solar wing center of mass 206 at the same position, the solar wing position actuator 108 changes its rotation direction. Normally, when spacecraft 100 enters eclipse, thermal transient is mild and its disturbance to spacecraft 100 is insignificant. At eclipse exit however, the spacecraft 100 solar panels 104 experience a quick temperature increase and a rapid thermal deformation of the solar wing panels 104, causing them to bend quickly away from the Sun. To compensate for the solar wing 114 motion resulting from the bending of the solar panels 104, the solar wing position actuator 108 rotates quickly towards Sun according to the solar wing 114 temperature measured by the temperature sensor 208 or predicted temperature. Under ideal circumstances (perfect compensation) the wing center of mass 206 remains in the undeformed wing plane 202 and no induced attitude disturbances are experienced by spacecraft bus 102.

A majority of three axis-stabilized spacecraft 100 have two solar wings 114 symmetrically mounted on spacecraft bus 102. Because of manufacturing errors, the thermal deformation of these symmetric solar wings 114 will not be identical, and will be at least somewhat asymmetric. For such spacecraft, it is not necessary to compensate completely the deformation of each solar wing 114. This is because what disturbs spacecraft bus is not the absolute thermal deformation of each solar wing 114, but differences between the deformations of both wings 114. To provide sufficient compensation, solar wing position actuators 108 of these solar wings 114 may be stepped in an asymmetric manner. With appropriate calibration, the disturbance can properly compensated with step magnitudes of solar wing position actuators 108 much smaller than what needed to compensate each solar wing 114 deformation completely. Thermal shock compensation can be achieved with relatively small solar wing 114 rotational displacements.

Figure 3:
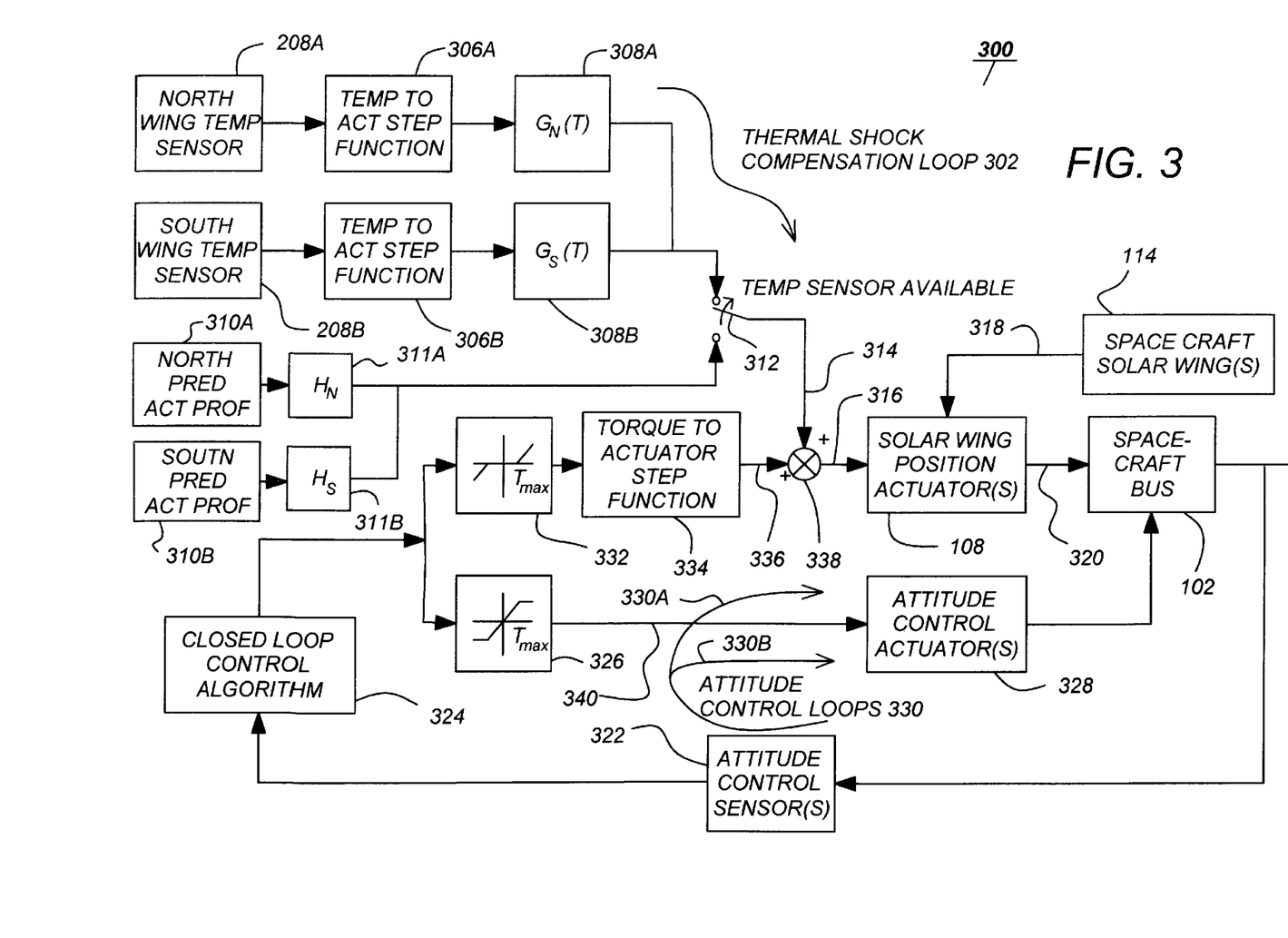
FIG. 3 is a block diagram of an exemplary thermal shock disturbance control system according to the principles of the present invention.

FIG. 3 is a block diagram of an exemplary thermal shock compensation system 300 in accordance with the principles of the present invention. The thermal shock compensation system 300 implements thermal shock disturbance 318 compensation using solar wing position actuators 108.

The thermal shock compensation system 300 comprises a thermal shock compensation loop 302 providing a compensation signal 314 to the solar wing position actuators 108 in the form of solar wing position actuator commands 316. The thermal shock compensation loop 302 comprises a North channel and a South channel. Elements corresponding to each channel are hereinafter designated by an "A" appended to the reference numeral for the North channel and a "B" appended to the reference numeral for the South channel. Each channel of the thermal shock compensation loop 302 includes a solar wing temperature sensor 208, a temperature-to-actuator transfer function 306 and a gain element 308. The temperature-to-actuator transfer function 306 is used to map temperature measurements to step commands of each of the solar wing position actuators 108, while the gain element is primarily used to account for differences between the North and South channels.

The output of the thermal shock compensation loop 302 after the gain elements 308 is a thermal shock compensation signal 314, which is used to generate solar wing position actuator commands 316. The solar wing position actuator commands 316 are provided to the solar wing position actuators 108 to rotate the solar wing 114 about the axis 110 to compensate for thermal shock effects. After application of this compensation, the spacecraft bus 102 is subjected to only the residual thermal shock disturbance torques 320 existing after application of the foregoing compensation.

In one embodiment of the invention, the step commands for the North solar wing 114A and South solar wing 114B are multiplied by different gains 308A and 308B, respectively in order to create asymmetric stepping between north and south wing actuators 108A and 108B. These gains 308A and 308B can calibrated on-orbit to create an optimal asymmetric stepping of north and south wing actuators 108A and 108B to minimize thermal shock transient error of the spacecraft 100 with smallest travel range of solar wing position actuators 108A and 108B.

When the solar wing 114 temperature measurements are available from the solar wing temperature sensors 208, these temperature measurements are applied to the temperature-to-actuator transfer functions 306 and gain elements 308 to generate the feedforward compensation 314 signal. When temperature sensor 208 measurements are not available, a predicted control step profile 310 can be used to generate the compensation signal 314 and command each solar wing position actuator 108. This functionality is shown diagrammatically by switch 312.

Calibration of both the gain elements 308A and 308B and the control profiles 310A and 310B can be performed in the initial operation phase of the spacecraft when it is flown in and out of eclipse. This can be accomplished by adjusting the gain and or control profile, and observing the effect on thermal shock disturbances with spacecraft 100 navigation sensors. Gain schedules or control profiles which have thus proven to be effective can be stored in a spacecraft control processing system 116 for subsequent thermal shock disturbance compensation after the calibration period.

An alternative approach to on-orbit calibration is one-day-ahead prediction. Using this method, the effects of the spacecraft thermal shock are measured each day, and each day's predicted thermal shock is determined from the thermal shock measurements taken on the previous day. This prediction technique is effective because the eclipse changes slowly over a 23-day period, and hence, thermal shock measurements vary little from one day to the next.

Although illustrated as separate predicted actuator profiles for the North and the South channel (310A and 310B, respectively), a single profile may be implemented for both channels. Further, in cases where temperature measurements are unavailable from only one channel, the predicted actuator profile may be used for both channels, or alternatively, for one channel while the measured temperature, transfer function and gain is used in the other channel.

The foregoing thermal shock compensation loop 302 of the thermal shock compensation system can be integrated with other elements of the spacecraft attitude feedback control system, including the attitude control loops 330A and 330B depicted in FIG. 3.

Attitude control loop 330B measures characteristics of the spacecraft bus 102 with attitude control sensors 322, and applies these measurements to an attitude control algorithm 324. Attitude control sensors 322 can include a combination of an inertial reference unit, accelerometers, gyros, star/sun sensors, magnetometer and the like. The closed loop control algorithm 324 processes and filters these measurements to arrive at a first feedback compensation signal 340 which is supplied in the form of an attitude control actuator command to the attitude control actuators 328. Unfortunately, the attitude control actuators 328 (which can include, for example, attitude control reaction wheels) have a limited control authority over the spacecraft 100. When reaction wheels are used, for example, the attitude control actuators 328 are limited in the amount of torque that can be applied ($T_{max}$). This is shown by limiting element 326.

For particularly large thermal shock disturbances (or when the spacecraft is subject to other disturbances or attitude control commands) the command from the closed loop control algorithm 324 may exceed the torque capacity of the attitude control actuators 328. In these circumstances, the attitude control system can exhibit sluggish response characteristics and possible instabilities. The present invention incorporates a second control loop 330A that takes advantage of high control torque capability of the solar wing position actuators 108 to provide additional control authority when the attitude control actuators 328 are saturated. In such circumstances, the commanded control torque from the attitude control algorithm 324 is provided to both attitude control actuators 328 and solar wing position actuators 108.

The second control loop 330A comprises a dead space non-linearity 332, coupled to a torque-to-actuator function 334. The dead space non-linearity 332 provides no output when the torque command is less than $T_{max}$, and a linear output for torque commands in excess of $T_{max}$. The torque-to-actuator function 334 translates the output of the dead space non-linearity 332 into a second attitude control signal 336. The second attitude control signal 336 is combined with the thermal shock compensation signal 314 by summer 338, and provided to the solar wing position actuators 108 in the form of a solar wing position actuator command 316. The second attitude control loop 330A allows the portion of commanded torque that exceeds the capability of the attitude control actuators 328 to be converted to solar wing position actuator 108 step commands that are sent to the solar wing position actuator 108 actuators for spacecraft attitude control. During thermal shock transient, the control torque of this integrated closed loop control system does not enter saturation even when the residual thermal shock disturbance after thermal shock compensation is very large. This feature is especially useful for spacecraft 100 with large solar wings 104.

Figure 4A:
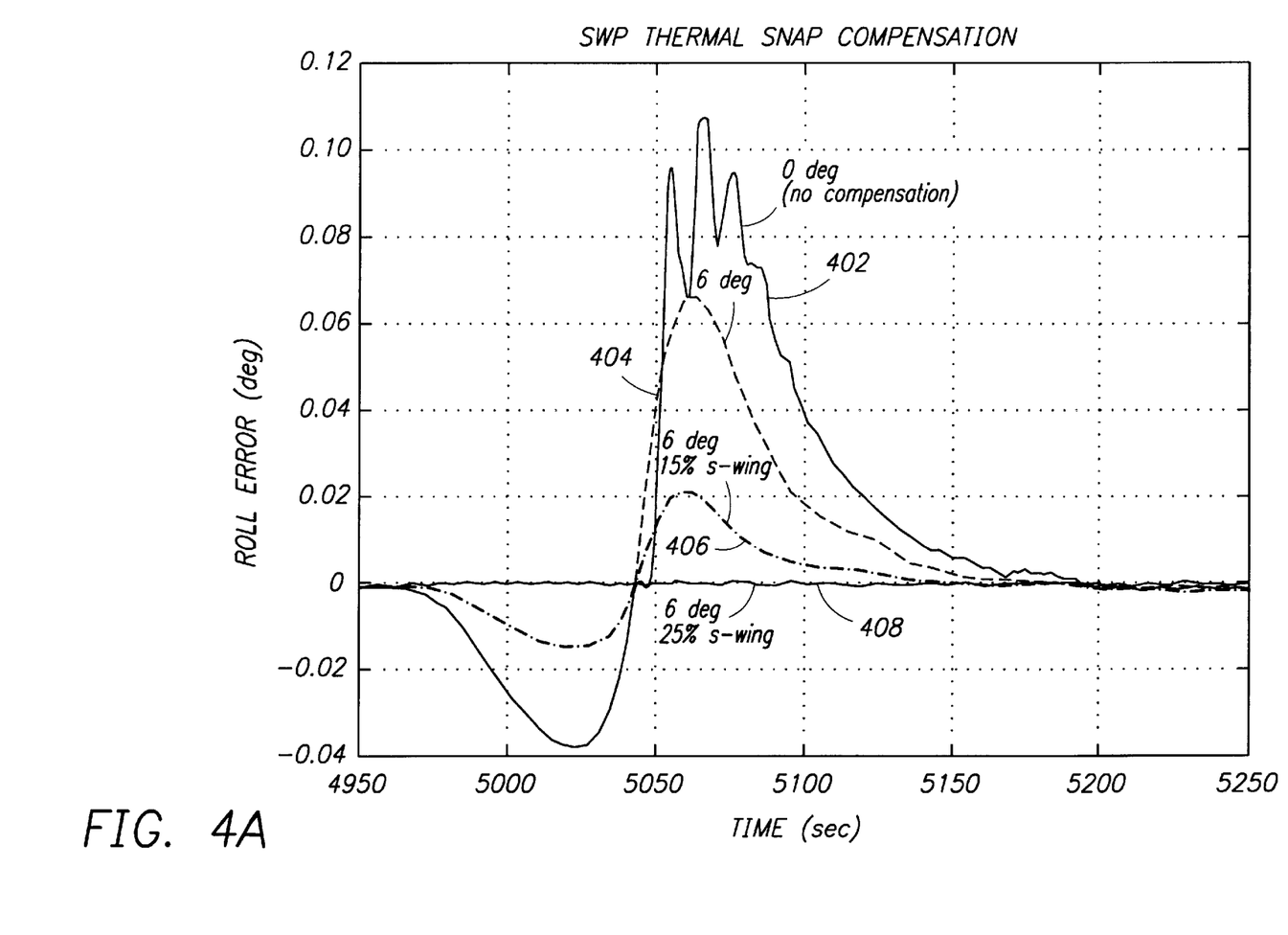
FIGS. 4A and 4B are plots of spacecraft pointing errors under exemplary thermal shock disturbances.

FIG. 4A is a diagram showing plots of roll pointing errors at eclipse exit for an exemplary spacecraft 100 implementing the thermal shock compensation system described above. In this study, the traveling range of the positioner used for thermal compensation was limited to plus and minus 6 degrees. The solid curve 402 shown in FIG. 4A presents the roll pointing error without thermal shock compensation. Without using the solar wing position actuators to minimize the induced thermal shock disturbances, the spacecraft attitude control system was able to reduce the roll pointing error to a maximum magnitude of 0.102 degrees. The dashed curve 404 shows the roll pointing error for a case wherein both the South and North wing position actuators 108A and 108B are stepped in the same number of steps and in same direction to compensate thermal shock disturbance of each respective solar wing 114. Note that the maximum roll pointing error is about 0.068 degrees.

While this demonstrates the effectiveness of the present invention, the foregoing required relatively large angular rotations of the solar wings 114 to sufficiently compensate the thermal deformation of each wing.

The dash-dot curve 406 shows the error reduction when South solar wing position actuator 108B was stepped for 15% more steps than the North solar wing position actuator 108A (this is implemented by setting the gain of the South channel gain element according to the following relationship $$G_s(T)=KG_N(T) \qquad (1)$$

sensing devices such as an IR sensor, or with a plurality of temperature sensors in different places on the solar wing 114 to measure temperature gradient variations along the surface of the solar wing 114. If desired, the temperature of the solar wing can also be measured as an estimate from other data For example, the current or voltage from the solar wing 114 can be used to estimate temperature if desired. Next, the solar wing 114 is rotated about a second axis 110A according to the predicted solar wing position or the measured temperature of the solar wing 114. The second axis 110A is substantially perpendicular to a vector 204 pointing from the spacecraft 100 to the Sun and to an axis 118 described by the longitudinal extent of the solar wing 114 (which is in the undeformed solar wing plane 202).

Figure 6:
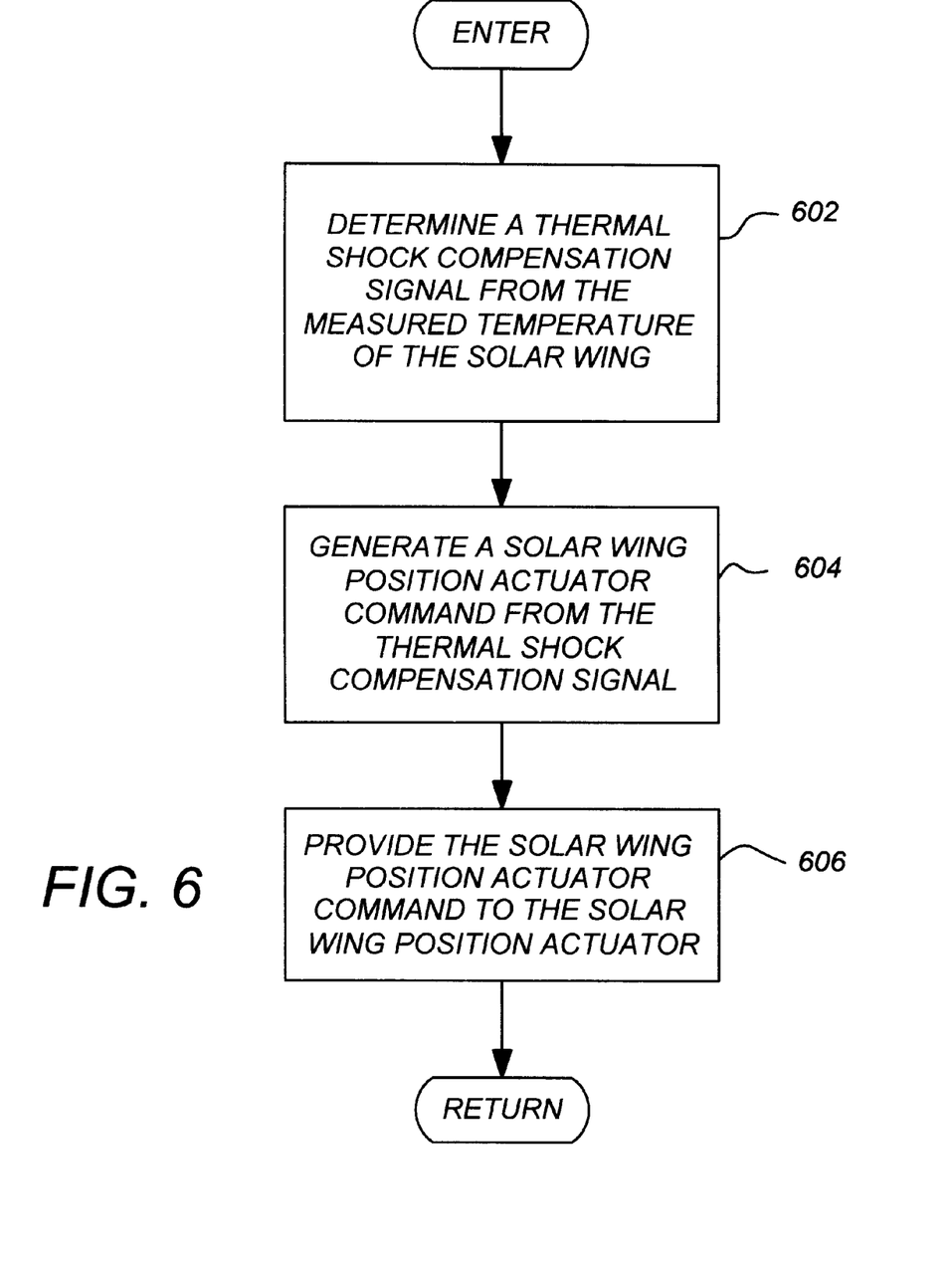
FIG. 6 is a flow chart showing exemplary method steps usable to rotate the solar wing to control thermal shock disturbances.

FIG. 6 is a flow chart illustrating exemplary method steps used to rotate the solar wing 114 when temperature measurements are available. A thermal shock compensation signal 314 from the measured temperature of the solar wing is determined, as shown in block 602. Then, the solar wing position actuator command 316 is generated from the thermal shock compensation signal 314, and provided to the solar wing position actuator 108. These steps are shown in blocks 604 and 606.

Figure 7:
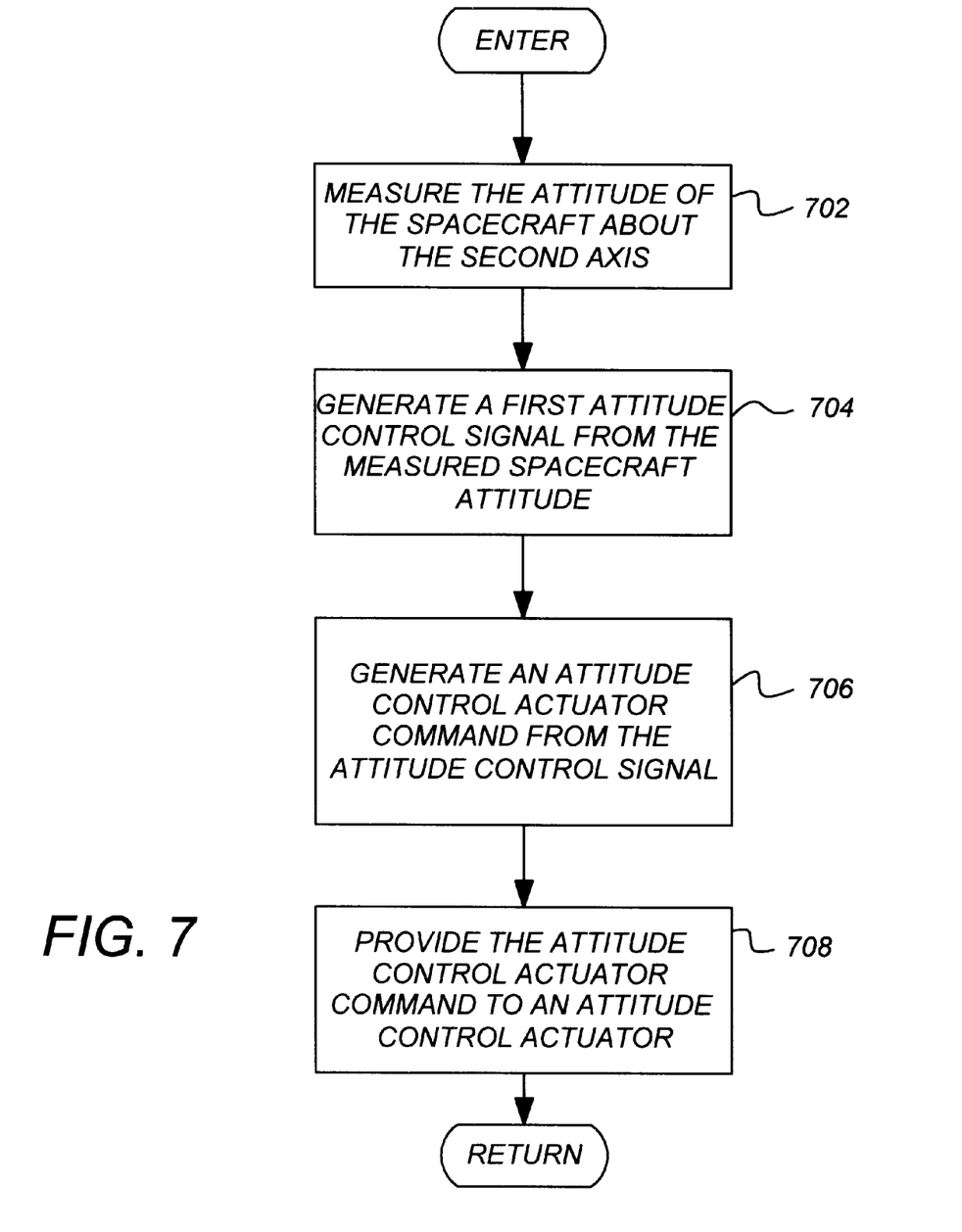
FIG. 7 is a flow chart showing exemplary method steps usable to augment feedforward control with feedback control using the measured spacecraft attitude.

FIG. 7 is a flow chart illustrating exemplary method steps used in an embodiment of the present invention in which the foregoing thermal shock compensation signal is used in conjunction with an attitude control loop using attitude control sensors 322 and attitude control actuators 328. First, the attitude of the spacecraft about the second axis 110A is measured, as shown in block 702. Then, an attitude control signal 340 and an associated attitude control actuator command is generated, as shown in blocks 704 and 706. The attitude control actuator command is then provided to an attitude control actuator 328, as shown in block 708.

Figure 8:
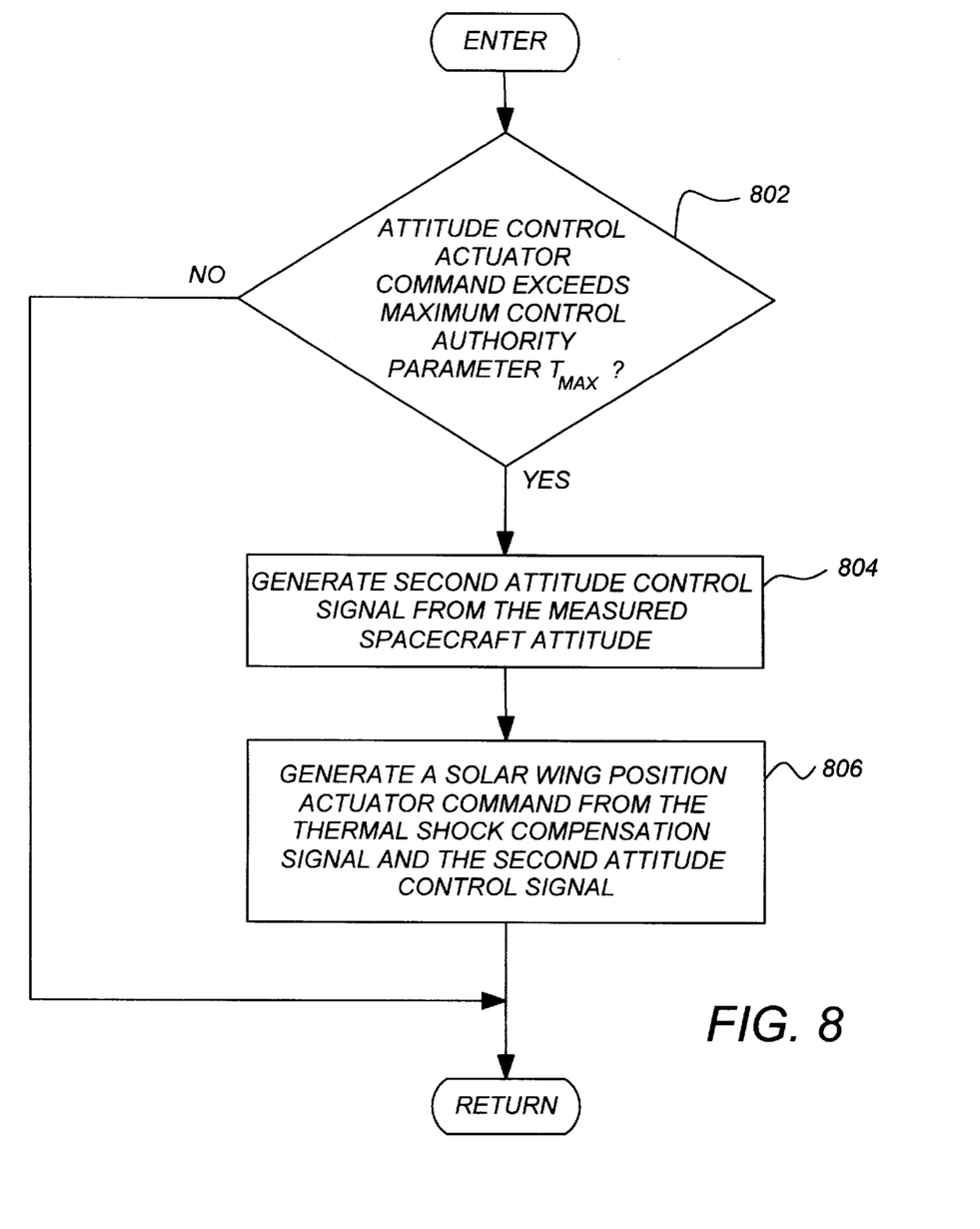
FIG. 8 is a flow chart illustrating exemplary steps used in another embodiment of the present invention in which feedback control from attitude control sensors are also supplied to the solar wing position actuators.

FIG. 8 is a flow chart illustrating exemplary steps used in another embodiment of the present invention in which attitude control from the attitude control sensors 322 is also supplied to the solar wing position actuators 108. As shown in block 802–804, when the attitude control actuator command exceeds a maximum control authority parameter $T_{max}$, a second attitude control signal is generated. This second attitude control signal 336 is combined with the thermal shock compensation signal 314 to generate the solar wing where K=1.15. In this case, the South solar wing 114B is rotated about axis 110B by an angle 112 approximately 15% more than the North solar wing 114A is rotated about axis 110A. This asymmetric compensation reduces the maximum error to about 0.022 degrees.

Curve 408 shows the roll pointing error when the South wing position actuator 108B is stepped 25% more steps than the North wing position actuator. In this case, thermal shock disturbance is compensated so well, the roll pointing error is effectively zero. An on-orbit calibration scheme similar to those described above can be used to determine an optimal value for K in equation (1).

Another consideration in the thermal shock compensation system 300 design is when to switch on thermal shock disturbance compensation.

Figure 4B:
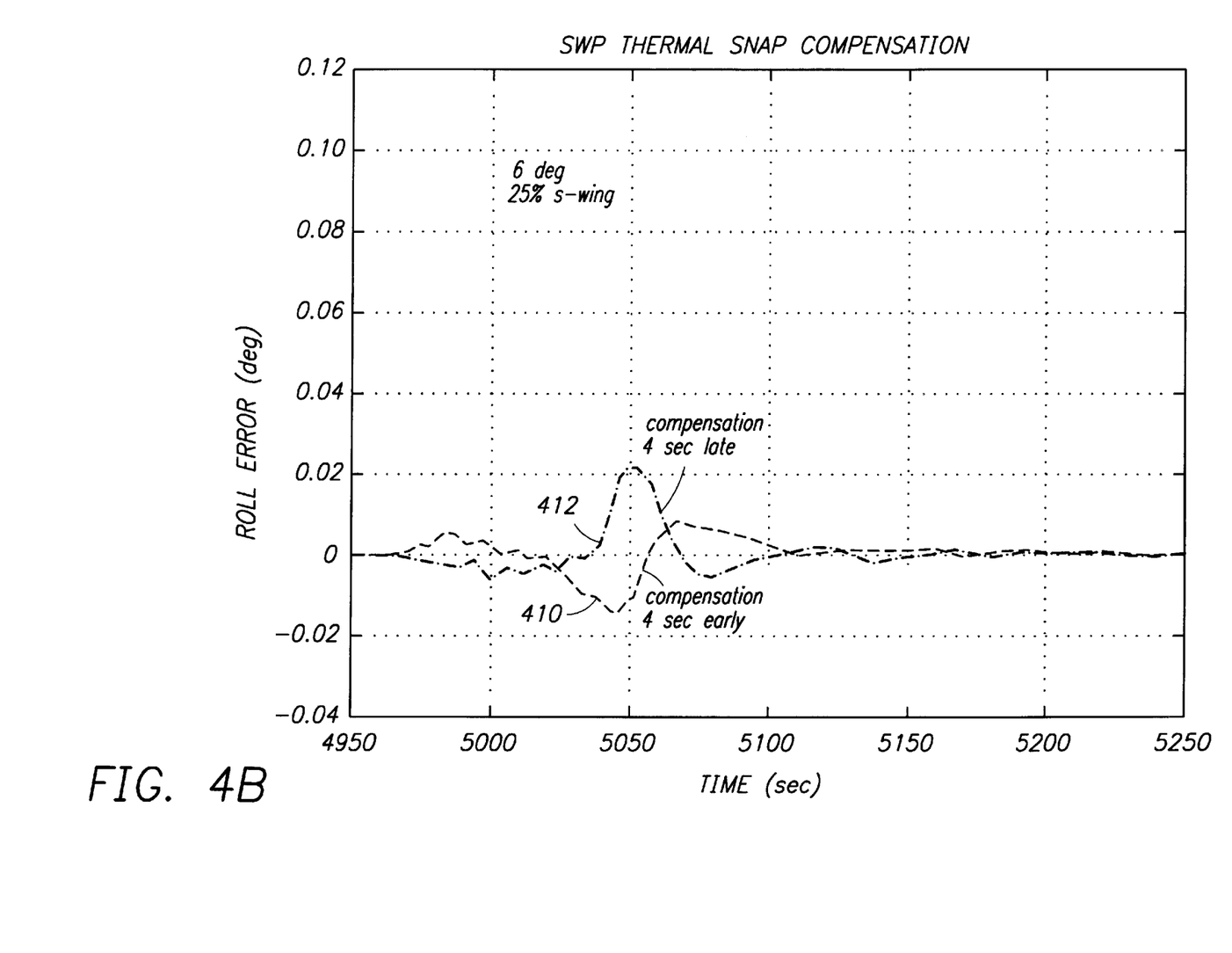

FIG. 4B is a diagram presenting the roll pointing error as a function of when the thermal shock compensation is applied. The dashed curve 410 shows a maximum spacecraft roll pointing error of 0.017 degrees when the compensation was switched on four seconds too early. The dashed-dot curve 412 shows a maximum spacecraft roll pointing error of 0.022 degrees when the compensation was four seconds too late. These results show that the timing of the application of the thermal shock compensation is important. If temperature measurements are available on solar wing panels, these measurements can be used to timing the compensation as well as adjusting compensation signals. In addition, the output voltage or current from the solar panels 104 can be monitored to determine when they have entered or left the eclipse.

Figure 5:
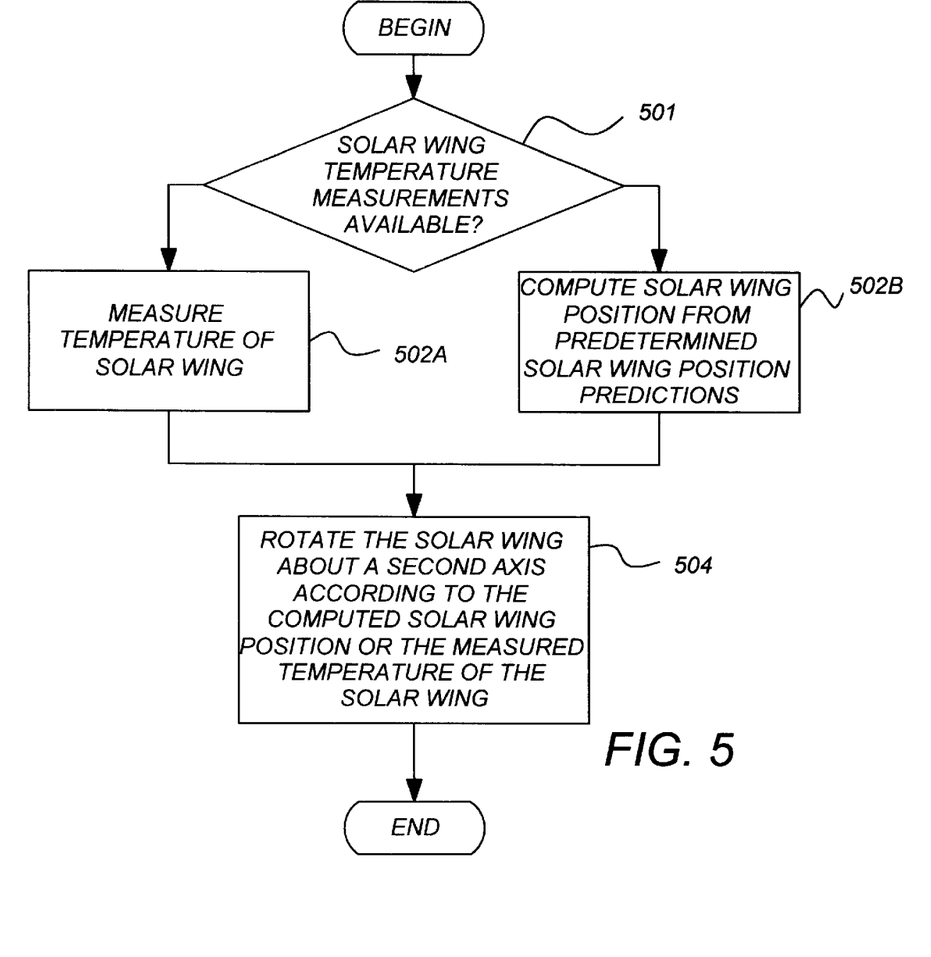
FIG. 5 is a flow chart showing exemplary method steps used to practice one embodiment of the present invention.

FIG. 5 is a flow chart presenting exemplary method steps used to practice the present invention. The method steps comprise the step of determining the solar wing compensation to compensate for the thermal disturbance. As shown in blocks 501, 502A, and 502B, this can be performed by measuring the temperature of the solar wing, or by computing the solar wing position from predetermined solar wing position predictions. The position prediction is derived from a detailed analysis (typically performed on the ground) and is calibrated during initial test periods of the spacecraft. Temperature measurements can be obtained using a single solar wing temperature sensor 208, or a number of solar wing temperature sensors. It can also be obtained using remote actuator position command 316. In the illustrated embodiment, the maximum control authority parameter is described in terms of torque. However, the principles described above can be used for other control schemes as well, such as those which describe a maximum rotation rate, or similar parameter.

The foregoing method steps are performed by a spacecraft control processing system 116 which is operatively coupled to the sensors and actuators described above as well as other electromechanical subsystems in the spacecraft. The transfer functions, gains, and algorithms noted in the above description can be implemented by hardware elements, by a separate spacecraft control processing system 116, or by a general purpose processor. For example, switch 312 can be implemented as a software instruction to the processor 116, or as a relay. Transfer functions 306 and 334 as well as the closed loop control algorithm 324 are typically implemented by a series of instructions necessary to implement non linear or linear gain scheduling and digital filtering processes. However, these functions can be implemented by analog components or a combination of analog and digital components as well.

Figure 9:
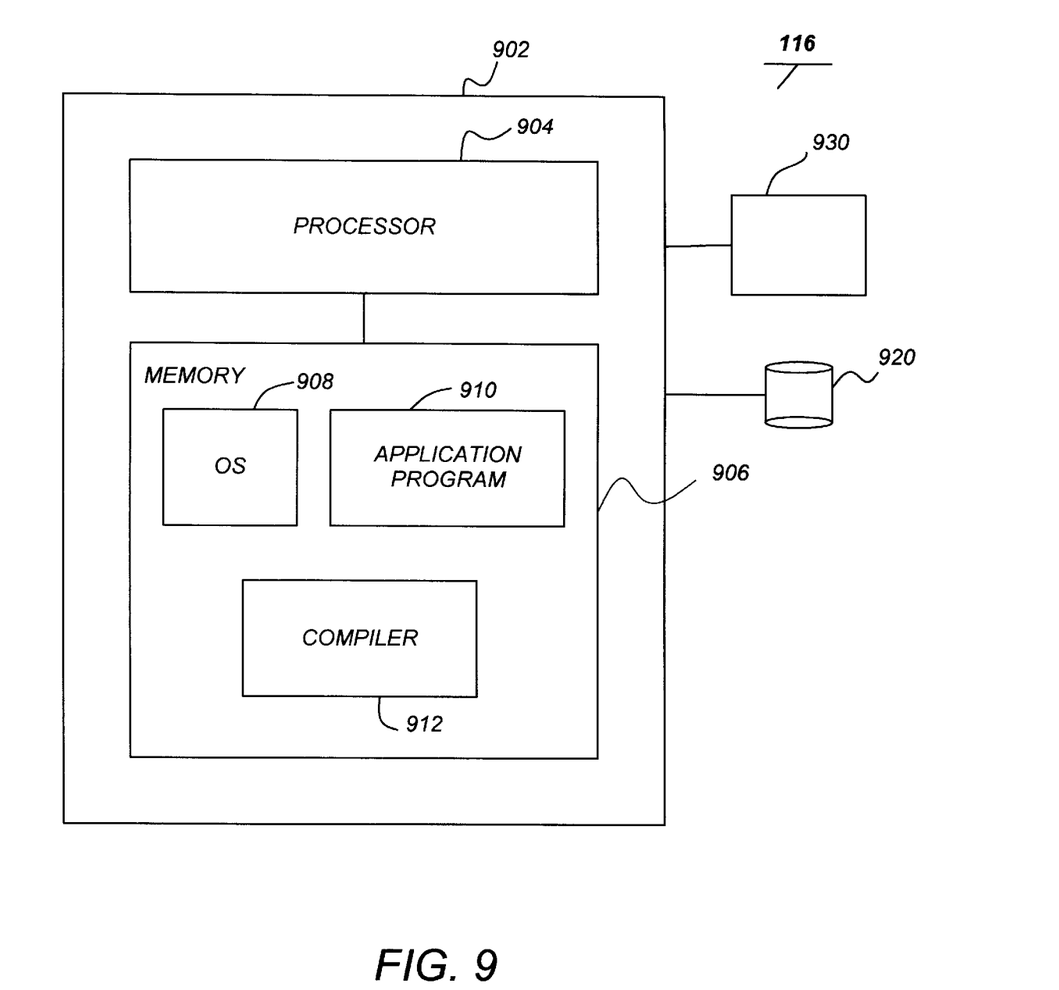
FIG. 9 is a diagram of an exemplary spacecraft control processing system.

FIG. 9 illustrates an exemplary spacecraft control processing system 116 that could be used to implement the present invention. The spacecraft control processing system 116 includes a computer 902 having a processor 904 and a memory 906, such as random access memory (RAM).

Generally, the computer 902 operates under control of an operating system 908 stored in the memory 906. The computer 902 may also implement a compiler 912 which allows one or more application programs 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a satellite link for communicating with other computers which are located, for example, at a ground station.

Instructions implementing the operating system 908, the application programs 910, and the compiler 912 may be tangibly embodied in a computer-readable medium, e.g., data storage device 920, which could include one or more program and/or data storage devices, such as a hard drive, CD-ROM drive, tape drive, etc. Further, the operating system 908 and the computer program 910 are comprised of instructions which, when read and executed by the computer 902, causes the computer 902 to perform the steps necessary to implement and/or use the present invention. Computer program 910 and/or operating instructions may also be partially or completely tangibly embodied in memory 906 and/or data communications devices 930, thereby making a computer program product or article of manufacture according to the invention. As such, the terms "article of manufacture" and "computer program product" or "program storage device" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components and other devices may be used with the present invention.

Conclusion

This concludes the description of the preferred embodiments of the present invention. In summary, the present invention describes a method, apparatus, and article of manufacture for compensating for solar wing thermal shock.

The method comprises the steps of either computing solar wing position from predetermined solar wing position predictions or by measuring the temperature of the solar wing extending from the satellite along a first axis. Then, the solar wing is rotated about a second axis according to the measured temperature of the solar wing, wherein the second axis is substantially perpendicular to the first axis and to a vector from the spacecraft to the sun. In one embodiment of the present invention, the predicted solar wing position or the measured solar wing temperature is used in a thermal shock compensation loop to command a solar wing position actuator to move the solar wing. In another embodiment applicable to satellites with multiple solar wings, asymmetric control is applied by independent adjustment of the compensation loop controlling each solar wing. In yet another embodiment of the present invention, the solar wing position actuator is further commanded by an attitude control loop using the measured spacecraft attitude.

The attitude control system comprises either predetermined solar wing position prediction during eclipse or at least one temperature sensor for measuring the temperature of the solar wing, at least one solar wing position actuator, cooperatively coupled to the solar wing, for rotating the solar wing about a second axis, wherein the second axis is substantially perpendicular to the first axis and to a vector from the spacecraft to the sun, and a thermal shock compensation loop, for generating at least one solar wing position actuator command to rotate the solar wing about the second axis in accordance with the computed solar wing position or the measured solar wing temperature to account for the thermal shock disturbance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling an attitude of a spacecraft having at least one solar wing extending therefrom along a first axis to compensate for a thermal shock disturbance, comprising the steps of:

determining solar wing compensation to compensate for the thermal shock disturbance, rotating the solar wing about a second axis according to the solar wing compensation, wherein the second axis is substantially perpendicular to the first axis and to a vector from the spacecraft to the sun and wherein the solar wing comprises a center of gravity, and the solar wing is rotated in an amount to maintain the center of gravity substantially along the first axis.

2. The method of claim 1, wherein the step of determining the solar wing compensation comprises the steps of;

measuring a temperature of the solar wing; and computing the solar wing compensation from the measured temperature of the solar wing.

3. The method of claim 1, wherein the step of determining the solar wing compensation comprises the step of:

estimating the solar wing compensation from a predicted solar wing thermal shock disturbance.

4. The method of claim 1, wherein the step of rotating the solar wing about the second axis according to the solar wing compensation comprises the steps of:

producing a thermal shock compensation signal from the computed solar wing compensation;

generating a solar wing position actuator command from the thermal shock compensation signal; and providing the solar wing position actuator command to a solar wing position actuator.

5. The method of claim 4, further comprising the steps of:

measuring an attitude of the spacecraft about the second axis;

generating a first attitude control signal from the measured spacecraft attitude;

generating an attitude control actuator command from the first attitude control signal; and providing the attitude control actuator command to an attitude control actuator.

6. The method of claim 5, further comprising the steps of:

generating a second attitude control signal from the measured spacecraft attitude; and generating the solar wing position actuator command from the thermal shock compensation signal and the second attitude control signal.

7. The method of claim 6, wherein the attitude control actuator includes a maximum control authority parameter, and the solar wing position actuator command is generated from the second attitude control signal only when the attitude control actuator command exceeds the maximum control authority parameter.

8. The method of claim 2, wherein the solar wing is rotated about the second axis according to a predicted solar wing temperature when the measured temperature of the solar wing is unavailable.

9. The method of claim 1, wherein the step of rotating the solar wing about the second axis according to the solar wing compensation comprises the steps of:

determining an amount of solar wing rotation about the second axis; and determining a time for applying the solar wing rotation from a parameter selected from the group comprising:

a measured temperature of the solar wing;

a measured solar wing electrical output; and a predicted thermal shock, wherein the predicted thermal shock is determined from at least one previously-observed thermal shock characteristic.

10. The method of claim 1, wherein the method further comprises the steps of:

determining a second solar wing compensation for a second solar wing to compensate for the thermal shock disturbances;

rotating the second solar wing about a third axis to the computed second solar wing compensation, wherein the third axis is substantially perpendicular to the first axis and to a vector from the spacecraft to the sun.

11. The method of claim 10, wherein the step of determining the second solar wing compensation for a second solar wing comprises the steps of:

measuring a temperature of the second solar wing;

computing the second solar wing compensation from the measured temperature of the second solar wing.

12. The method of claim 10, wherein the step of determining the second solar wing compensation for a second solar wing comprises the step of:

estimating the second solar wing compensation from a predicted second solar wing thermal shock disturbance.

13. The method of claim 10, wherein the second solar wing is rotated asymmetrically from the first solar wing.

14. The method of claim 10, wherein: the step of rotating the solar wing about the second axis according to the solar wing compensation comprises the steps of:

determining a thermal shock compensation signal by applying a measured temperature of the solar wing to a first function $f_1(T)$ wherein T is the measured temperature of the solar wing;

generating a solar wing position actuator command from the thermal shock compensation signal; and providing the solar wing position actuator command to a solar wing position actuator;

the step of rotating the second solar wing about the third axis according to the second solar wing compensation comprises the steps of:

determining a second thermal shock compensation signal from a measured temperature of the second solar wing by applying the measured temperature of the second solar wing to the function $f_1(T)$;

multiplying the second thermal shock compensation signal by a constant K to generate a second solar wing position actuator command from the second thermal shock compensation signal;

providing the solar wing position actuator signal to a second solar wing position actuator.

15. An attitude control system for compensating for thermal shock disturbances in a spacecraft having at least one solar wing extending therefrom along a first axis, the attitude control system comprising:

at least one solar wing position actuator, cooperatively coupled to the solar wing, for rotating the solar wing about a second axis, wherein the second axis is substantially perpendicular to the first axis and to a vector from the spacecraft to the sun;

a thermal shock compensation loop, for generating at least one solar wing position actuator command to rotate the solar wing about the second axis to compensate for the thermal shock disturbance; and wherein the solar wing comprises a center of gravity and the thermal shock compensation loop generates solar wing position commands to rotate the solar wing in an amount to maintain the center of gravity substantially along the first axis.

16. The apparatus of claim 15, wherein the solar wing position actuator command is determined from a temperature of the solar wing, and the apparatus further comprises:

at least one temperature sensor, for measuring the temperature of the solar wing.

17. The apparatus of claim 16, wherein the thermal shock compensation loop comprises thermal shock compensation for transforming the measured temperature of the solar wing into solar wing position actuator commands.

18. The apparatus of claim 16, further comprising a processor for predicting the temperature of the solar wing and for substituting the predicted temperature of the solar wing when the measured temperature of the solar wing is unavailable.

19. The apparatus of claim 16, wherein the thermal shock compensation loop generates solar wing position actuator commands in an amount and to be applied at a time according to the measured temperature.

20. The apparatus of claim 15, wherein the solar wing position actuator command is determined from a predicted solar wing thermal shock disturbance.

21. The apparatus of claim 20, wherein the thermal shock compensation loop generates solar wing position actuator commands in an amount and to be applied at a time according to the predicted thermal shock disturbance.

22. The apparatus of claim 15, wherein the thermal shock compensation loop is implemented by a processor performing instructions to rotate the solar wing about the second axis in accordance with the measured spacecraft attitude to compensate for the thermal shock disturbance.

23. The apparatus of claim 15, further comprising an attitude control loop for generating a control signal to control the attitude of the spacecraft, the attitude control loop having:

at least one attitude sensor for measuring the attitude of the spacecraft about the second axis;

a feedback compensation module for generating the feedback control signal from the measured spacecraft attitude; and an attitude control actuator, communicatively coupled to the feedback compensation module for changing the attitude of the spacecraft according to the feedback control signal.

24. The apparatus of claim 23, further comprising a second attitude control loop, having:

a second attitude control compensation module for generating a second attitude control compensation signal from the measured spacecraft attitude;

a summer for combining the thermal shock compensation signal and the second attitude control compensation signal to generate solar wing position actuator commands.

25. The apparatus of claim 23, wherein the attitude control actuator includes a maximum control authority parameter, and the solar wing position actuator command is generated from the second attitude control signal only when the attitude control actuator command exceeds the maximum control authority parameter.

26. The apparatus of claim 15, wherein the spacecraft further comprises a second solar wing, and the attitude control system further comprises:

a second solar wing position actuator, cooperatively coupled to the second solar wing, for rotating the second solar wing about a third axis, wherein the third axis is substantially perpendicular to the first axis and to a vector from the spacecraft to the sun; and a second thermal shock compensation control loop, for generating at least one second solar wing position actuator command to rotate the second solar wing about the third axis to compensate for the thermal shock disturbance.

27. The apparatus of claim 25, wherein the second solar wing position actuator command is determined from a temperature of the second solar wing, and the apparatus further comprises:

a second temperature sensor, for measuring the temperature of the second solar wing.

28. The apparatus of claim 25, wherein the second solar wing position actuator command is determined from a predicted solar wing position.

29. The apparatus of claim 25, wherein a steady state gain of the second thermal shock compensation loop differs from a steady state gain of the first thermal shock compensation loop.

* * * * *